(12) United States Patent
Shirokoshi

(10) Patent No.: US 9,897,195 B2
(45) Date of Patent: Feb. 20, 2018

(54) PLANETARY GEAR DRIVE

(71) Applicant: Harmonic Drive Systems Inc., Shinagawa-ku, Tokyo (JP)

(72) Inventor: Norio Shirokoshi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 28 days.

(21) Appl. No.: 15/166,540

(22) Filed: May 27, 2016

(65) Prior Publication Data

US 2017/0314671 A1    Nov. 2, 2017

(30) Foreign Application Priority Data

Sep. 10, 2015 (JP) ................................. 2015-178816

(51) Int. Cl.
*F16H 57/04* (2010.01)
*F16H 57/08* (2006.01)

(52) U.S. Cl.
CPC ..... *F16H 57/0464* (2013.01); *F16H 57/0479* (2013.01); *F16H 57/0486* (2013.01); *F16H 57/08* (2013.01); *F16H 2057/085* (2013.01)

(58) Field of Classification Search
CPC ............. F16H 57/0464; F16H 57/0479; F16H 57/0482; F16H 57/0486; F16H 57/08; F16H 2057/085
See application file for complete search history.

(56) References Cited

U.S. PATENT DOCUMENTS

| 5,302,160 A * | 4/1994 | Fujioka | F16H 57/082 475/348 |
| 8,591,371 B2 * | 11/2013 | Dinter | F16C 17/10 475/160 |
| 8,840,521 B2 * | 9/2014 | Kari | F16C 33/203 475/331 |
| 2012/0108380 A1 * | 5/2012 | Dinter | F16C 17/10 475/159 |
| 2015/0252849 A1 * | 9/2015 | Kawai | F16C 33/4676 384/565 |
| 2015/0361962 A1 * | 12/2015 | Hager | F16H 57/043 475/159 |

FOREIGN PATENT DOCUMENTS

| JP | 2007-71355 A | | 3/2007 | |
| JP | 2007232054 A | * | 9/2007 | ......... F16H 57/0463 |
| WO | WO 2014117196 A | * | 8/2014 | ............. F16H 57/04 |

* cited by examiner

*Primary Examiner* — Justin Holmes
*Assistant Examiner* — David R Morris
(74) *Attorney, Agent, or Firm* — Buchanan Ingersoll & Rooney PC

(57) ABSTRACT

A planetary gear drive has needle roller bearings of full roller type as planetary gear bearings for planetary gears. The needle roller bearings have lubrication mechanisms, respectively. Each lubrication mechanism has an annular grease retaining groove. The grease retaining groove is formed on an inner peripheral surface (an outer-race-side raceway surface) of the shaft hole of each planetary gear. Poor lubrication can be prevented from occurring when needle roller bearings of full roller type are employed as the planetary gear bearings.

4 Claims, 3 Drawing Sheets

PLANETARY GEAR DRIVE

TECHNICAL FIELD

The present invention relates to a lubrication mechanism for the planetary gear bearing of a planetary gear drive.

BACKGROUND ART

Needle roller bearings are often used for planetary gear bearings of a planetary gear drive in the consideration of capacity, shape and the like. Recently, full roller type needle roller bearings are often used to increase load capacity.

Patent document 1 proposes a lubrication structure for needle roller bearings used as the planetary gear bearing of a planetary gear drive. In this document, it is described that spiral lubricant retaining grooves are formed on outer peripheral surfaces of needle rollers.

Patent Document 1: JP 2007-71355 A

When needle roller bearings, especially, those of full roller type are used for a planetary gear bearing, lubricant retaining space is limited, so that there is a risk of poor lubrication if grease lubrication is employed.

SUMMARY OF THE INVENTION

An object of the present invention is to provide a planetary gear drive with a lubrication mechanism capable of preventing occurrence of poor lubrication even when a needle roller bearing of full roller type is used for a planetary gear bearing.

In order to achieve the above and other objects, according to the present invention, there is provided a planetary gear drive comprising:

at least one planetary gear;

a planetary shaft for supporting the planetary gear via a planetary gear bearing in a free rotating state; and a lubrication mechanism for lubricating the planetary gear bearing, wherein the planetary gear bearing is a needle roller bearing having an outer-race-side raceway surface formed on an inner peripheral surface of a shaft hole of the planetary gear, an inner-race-side raceway surface formed on an outer peripheral surface of the planetary shaft, and needle rollers arranged in a free rotating state between the outer-race-side raceway surface and the inner-race-side raceway surface, and the lubrication mechanism has at least one grease retaining recess formed on the outer-race-side raceway surface.

One or plural annular grooves extending in a circumferential direction of the outer-race-side raceway surface may be employed as the grease retaining recess. When a single grease retaining groove is formed, it is preferable that the groove is formed in the center of the outer-race-side raceway surface along the width direction thereof.

According to the present invention, a risk of poor lubrication of the planetary gear bearing can be mitigated by means of grease filled in the grease retaining groove. For example, the inventor of the present invention et al. conducted a durability test for planetary gear drives of the same size and structure, in which one is provided with the grease retaining groove and the other is not provided with the groove. According to the test results, it was confirmed that bearing damages caused by poor lubrication that occurred when the groove had not been provided, can be prevented by the provision of the groove.

MODE FOR CARRYING OUT THE INVENTION

An embodiment of the planetary gear drive according to the present invention will be described with reference to the drawings.

Figure 1:
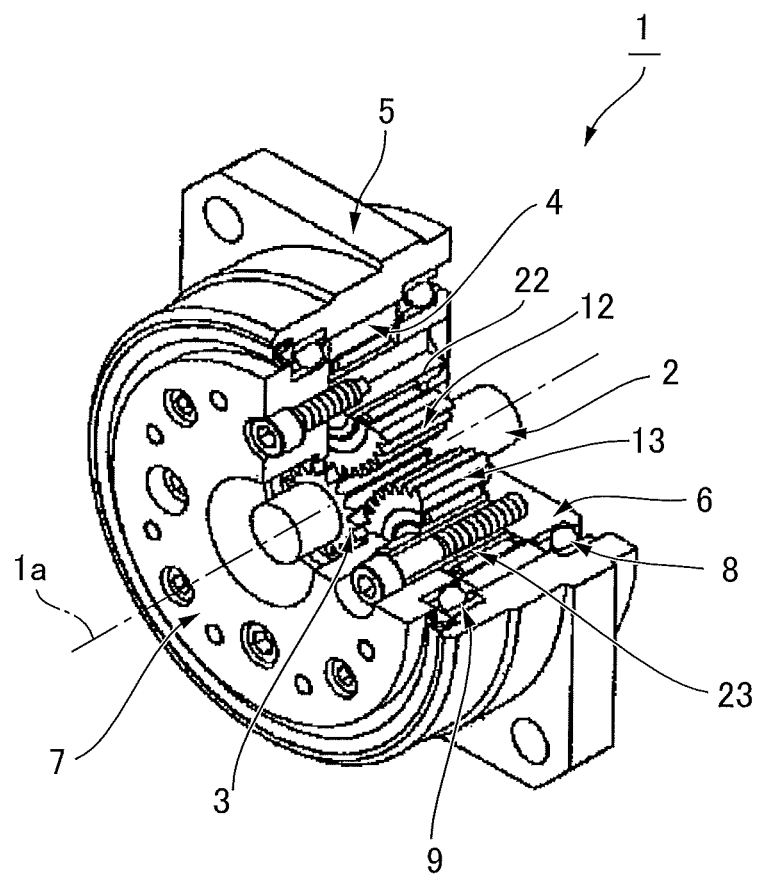
FIG. 1 is perspective view showing a planetary gear drive to which the present invention can be applied, in which part of the drive is omitted.
Figure 2:
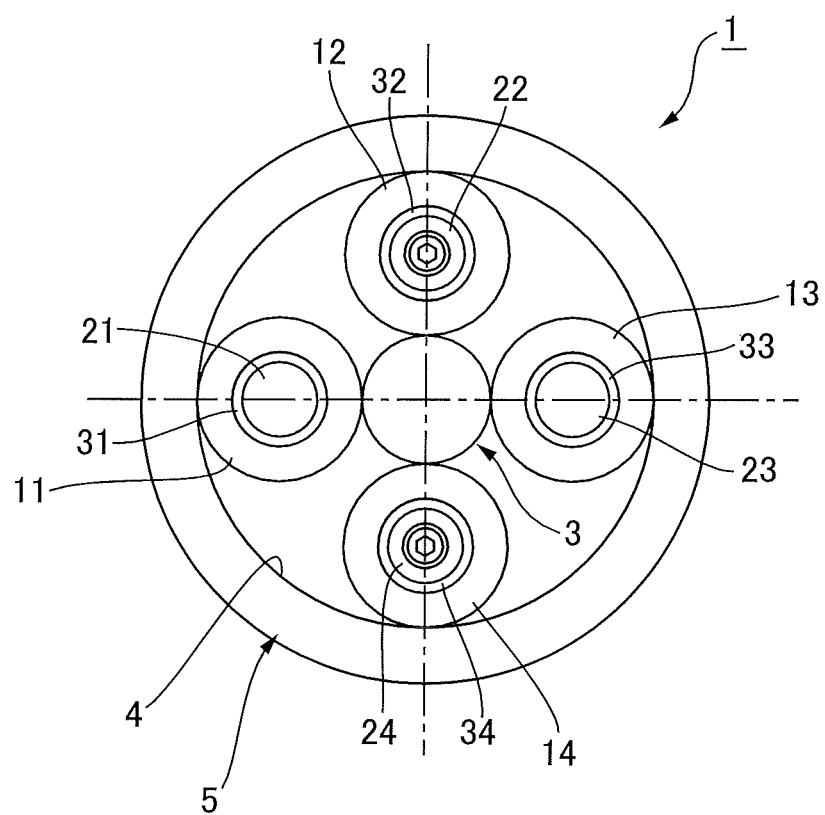
FIG. 2 is a schematic view showing arrangement of planetary gears of the planetary gear drive of FIG. 1.

As shown in FIGS. 1 and 2, the planetary gear drive 1 comprises a sun gear 3 formed on the outer periphery of an input pinion shaft 2, four planetary gears 11 to 14 meshing with the sun gear 3, a drive housing 5 formed with an internal gear 4 meshing with the planetary gears 11 to 14, and, an input-side carrier 6 and an output-side carrier 7 for rotatably supporting the planetary gears 11-14. The carriers 6 and 7 are supported in a free rotating state on the side of the drive housing 5 via an input-side radial ball bearing 8 and an output-side radial ball bearing 9, respectively.

Two planetary shafts 22 and 24 are fixed in a cantilevered condition to the carrier 6. The planetary gears 12 and 14 are mounted in a free rotating state on the planetary shafts 22, 24 via full roller type needle roller bearings 32 and 34, respectively. Similarly, two planetary shafts 21 and 23 are fixed in a cantilevered condition to the other carrier 7. The planetary gears 11 and 13 are mounted in a free rotation state on the planetary shafts 21 and 23 via full roller type needle roller bearings 31 and 33, respectively. With this, backlash in the clockwise and counterclockwise rotations can be eliminated by relatively rotating the two carriers 6 and 7 about the center axis line 1a.

Figure 3:
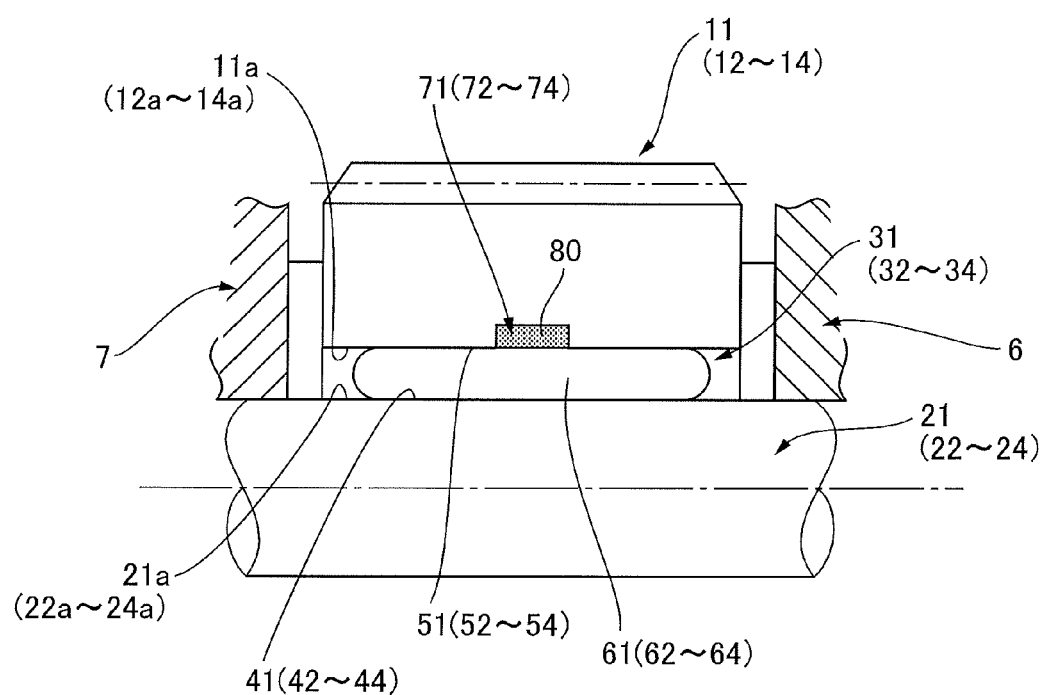
FIG. 3 is an explanatory view showing a lubrication mechanism of the planetary gear bearing of the planetary gear drive of FIG. 1.

FIG. 3 is an explanatory view showing the needle roller bearing 31 (32 to 34) as the planetary gear bearing of the planetary gear 11 (12 to 14), and the lubrication mechanism therefor. The needle roller bearing 31 (32 to 34) has an inner-race-side raceway surface 41 (42 to 44) formed on a circular outer peripheral surface 21a (22a to 24a) of the planetary shaft 21 (22 to 24); an outer-race-side raceway surface 51 (52 to 54) formed on an inner peripheral surface 11a (12a to 14a) of a shaft hole of the planetary gear 11 (12 to 14); and a plurality of needle rollers 61 (62 to 64) inserted in a free rotating state between the raceways 41 (42 to 44) and 51 (52 to 54).

In the present embodiment, an annular grease retaining groove 71 (72 to 74) is formed for the lubrication mechanism of the needle roller bearing 31 (32 to 34). Grease 80 is retained in the grease retaining groove 71 (72 to 74). The grease retaining groove 71 (72 to 74) is located at the center in the width direction of the outer-race-side raceway surface 51 (52 to 54), the groove extending along the circumferential direction.

The sectional groove shape of the grease retaining groove 71 (72 to 74) may be rectangle, triangle, circular arc and the like. The grease retaining groove 71 (72 to 74) may be a groove of ring, spiral or other shapes. The width, depth and length of the grease retaining groove 71 (72 to 74) may be set in an appropriate manner according to a required amount of grease.

The contact length between the needle roller and the outer-race-side raceway surface is reduced due to the formation of the grease retaining groove. This can cause the bearing capacity to somewhat decrease. However, since the needle roller bearing of full roller type has a high capacity in comparison with the needle roller bearing of the type having a retainer, there is no problem in a practical use.

(Other Embodiments)

The lubrication mechanism of the above embodiment is provided with a single annular grease retaining groove. It is possible to provide a plurality of grease retaining grooves. It is also possible to employ, as a grease retaining portion, a plurality of grease retaining recesses that are formed in a discontinuous manner on the inner peripheral surface of the shaft hole of the planetary gear (the outer-race-side raceway surface).

It is needless to say that the constitution or structure of the planetary gear drive is not limited to that shown in the drawings.

The invention claimed is:

1. A planetary gear drive comprising:
   a planetary gear;
   a planetary shaft for supporting the planetary gear via a planetary gear bearing in a free rotating state; and
   a lubrication mechanism for lubricating the planetary gear bearing, wherein
      the planetary gear bearing is a needle roller bearing being a full roller bearing having an outer-race-side raceway surface formed on an inner peripheral surface of a shaft hole of the planetary gear, an inner-race-side raceway surface formed on an outer peripheral surface of the planetary shaft, and needle rollers arranged in a free rotating state between the outer-race-side raceway surface and the inner-race-side raceway surface, and
   the lubrication mechanism has a grease retaining recess formed on the outer-race-side raceway surface, and a pre-set amount of grease stored in the grease retaining recess.

2. The planetary gear drive according to claim 1, wherein the grease retaining recess is one or plural annular grooves extending in a circumferential direction of the outer-race-side raceway surface.

3. The planetary gear drive according to claim 2, wherein the grease retaining groove extends in the circumferential direction of the outer-race-side raceway surface and is located at a center part of the outer-race-side raceway surface along a width direction thereof.

4. The planetary gear drive according to claim 1, wherein a plurality of the grease retaining recesses are formed in a discontinuous manner on the outer-race-side raceway surface.

* * * * *